(12) United States Patent
Muraoka et al.

(10) Patent No.: US 7,530,380 B2
(45) Date of Patent: May 12, 2009

(54) TUBELESS TIRE

(75) Inventors: Kiyoshige Muraoka, Kobe (JP); Noriko Yagi, Kobe (JP); Kazuyuki Nishioka, Kobe (JP); Nobuhiro Osaki, Ichihara (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 271 days.

(21) Appl. No.: 10/679,406

(22) Filed: Oct. 7, 2003

(65) Prior Publication Data

US 2005/0098252 A1 May 12, 2005

(30) Foreign Application Priority Data

| Oct. 8, 2002 | (JP) | 2002-294590 |
| Dec. 20, 2002 | (JP) | 2002-370471 |
| Dec. 20, 2002 | (JP) | 2002-370472 |
| Dec. 20, 2002 | (JP) | 2002-370473 |

(51) Int. Cl.
*B60C 5/14* (2006.01)

(52) U.S. Cl. ............ 152/510; 152/DIG. 16

(58) Field of Classification Search ......... 152/510, 152/548, DIG. 16
See application file for complete search history.

(56) References Cited

U.S. PATENT DOCUMENTS

| 5,333,662 A | 8/1994 | Costemalle et al. |
| 5,576,372 A * | 11/1996 | Kresge et al. ............... 524/442 |
| 5,700,560 A * | 12/1997 | Kotani et al. ............... 428/325 |
| 5,766,751 A | 6/1998 | Kotani et al. |
| 5,969,029 A | 10/1999 | Kotani et al. |
| 6,136,123 A * | 10/2000 | Kaido et al. ............... 156/123 |
| 6,146,750 A | 11/2000 | Kotani et al. |
| 6,316,093 B1 * | 11/2001 | Kotani et al. ............... 428/323 |
| 2001/0009948 A1 * | 7/2001 | Hopkins et al. ............... 525/330.7 |

FOREIGN PATENT DOCUMENTS

| EP | 601877 A1 * | 6/1994 |
| EP | 763563 A1 * | 3/1997 |
| EP | 1193084 A2 * | 4/2002 |
| EP | 1195402 A1 * | 4/2002 |
| EP | 1215242 A1 * | 6/2002 |
| EP | 1228900 A2 * | 8/2002 |
| GB | 769286 A * | 3/1957 |
| JP | 5508435 T | 11/1993 |
| JP | 6-40207 A | 2/1994 |
| JP | 6-93133 A | 4/1994 |
| JP | 7-247374 A | 9/1995 |
| JP | 7-251487 A | 10/1995 |
| JP | 10-16082 A | 1/1998 |

(Continued)

*Primary Examiner*—Geoffrey L Knable
(74) *Attorney, Agent, or Firm*—Birch, Stewart, Kolasch & Birch, LLP

(57) ABSTRACT

The present invention provides a tubeless tire in which air permeability is significantly decreased. Specifically, the present invention relates to a tubeless tire wherein an air chamber is formed between the inner face of a tire body and a rim, by mounting the tire body to the periphery of the rim, and a gas barrier layer, comprising an inorganic layered compound having a particle size of at most 5 μm and an aspect ratio of 50 to 5000 and a resin, is formed on the inner face of the tire body.

18 Claims, 2 Drawing Sheets

FOREIGN PATENT DOCUMENTS

| | | | |
|---|---|---|---|
| JP | 11-140234 A | * | 5/1999 |
| JP | 2000063572 A | | 2/2000 |
| JP | 2000-177307 A | | 6/2000 |
| JP | 2000159936 A | | 6/2000 |
| JP | 2000160024 A | | 6/2000 |
| JP | 2002-79804 A | | 3/2002 |
| JP | 2002-114870 A | | 4/2002 |
| JP | 2002103469 A | | 4/2002 |
| WO | WO-94/22680 A1 | * | 10/1994 |
| WO | WO98/56598 | * | 12/1998 |

* cited by examiner

TUBELESS TIRE

This nonprovisional application claims priority under 35 U.S.C. §119(a) on Patent Application Nos. 2002-294590; 2002-370471; 2002-370472 and 2002-370473 filed in JAPAN on Oct. 8, 2002; Dec. 20, 2002; Dec. 20, 2002 and Dec. 20, 2002, respectively, which are herein incorporated by reference.

BACKGROUND OF THE INVENTION

The present invention relates to a pneumatic tire, more specifically, a pneumatic tire in which air permeability is significantly decreased.

A tubeless tire wherein an air chamber is formed between the inner face of a tire body and a rim, by mounting the tire body to the periphery of the rim, is widely used and well known as a tire for automobiles and autocycles, from the viewpoint that a rubber tube is not necessary and handling is easy.

A pneumatic tire supports load and exhibits various properties such as riding comfort by supplying air into the tire and so, maintaining the air pressure within the tire is extremely important.

In order to do so, usually, an inner liner layer comprising rubber with low air permeability, such as butyl rubber and halogenated butyl rubber, is formed on the inner face of the tubeless tire. However, because rubber material has some air permeability, the air within the tire, which was supplied in advance so as to become the specified pressure, gradually leaks over time and the air pressure gradually decreases. As a result, bothersome maintenance, such as periodically inspecting the tire and refilling with air, was necessary.

On the other hand, decrease in fuel consumption is a large technical problem for automobiles and as part of this problem, demands for a lightweight pneumatic tire are becoming stronger. In order fulfill the demands, development of an inner liner, in which air permeability is decreased further, is an urgent task. If such a composition for an inner liner is developed, the inner liner layer can be made thin and lightweight tires can be obtained.

As the inner liner of a pneumatic tire, methods of using various materials instead of rubber with low air permeability, such as butyl rubber, have been suggested. For example, JP-B-47-31761 discloses applying a solution or dispersion solution of synthetic resin, such as polyvinylidene chloride, saturated polyester resin and polyamide resin, with even lower air permeability, to the inner face of the tire. However, the method disclosed in this document has a problem in adhesion between the rubber layer and the synthetic resin layer inside the pneumatic tire and the fault of the inner liner being poor in moisture resistance.

JP-A-5-330397 discloses conducting halogenation treatment of the inner face of the tire and forming thereon a polymer film of methoxy methylated nylon, copolymerized nylon, a mixture of polyurethane and polyvinylidene chloride or a mixture of polyurethane and polyvinylidene fluoride.

JP-A-5-318618 discloses a pneumatic tire having a thin film of methoxy methylated nylon as the inner liner layer. More specifically, the method of spreading or applying a solution or emulsion of methoxy methylated nylon to the inner face of a green tire or the inner face of a vulcanized tire is disclosed. However, the methods disclosed in these documents have the fault of difficulty in maintaining evenness of film thickness, in addition to the fault of the thin film being poor in moisture resistance.

JP-A-6-40207 discloses an example in which a thin film having a layer with low air permeability comprising a polyvinylidene chloride film or a ethylene-vinyl alcohol copolymer film and an adhesive layer comprising a polyolefin-type film, an aliphatic polyamide film or a polyurethane film is used as the air permeability prevention layer. However, in this example, the layer with low air permeability lacks flexibility and the thin film cannot follow the deformation of the material when running the tire, causing cracks.

JP-A-2000-177303 suggests a tubeless tire in which an air impermeable layer comprising an ethylene-vinyl alcohol copolymer formed into a film is bonded and unified to the inner face of the tire body either directly or via an adhesive resin. However, even in such an air impermeable layer comprising an ethylene-vinyl alcohol copolymer, gas barrier properties are insufficient and the time for which the specified air pressure is maintained cannot necessarily be fulfilled. Also, the tire is prepared by bonding the film to the inner face of the tire body formed in advance to a specified shape or by bonding the film to the tire material before molding and then molding into a tire shape. In the case of the former method, because the inner face of the tire body is narrow and concave, evenly bonding the film to the inner face is difficult in terms of operation. Also, unevenness in bonding tends to occur and from such areas, air tends to leak. In the case of the latter method, because the surface of the tire material and surface of the film are bonded, smoothness between the bonded surfaces is required and when smoothness is insufficient, problems such as exfoliation tend to occur.

JP-A-5-508435 suggests using a composition containing carbon black, a plasticizer and a vulcanizer in rubber obtained by halogenating a copolymer of isomonoolefin having 4 to 7 carbon atoms and paraalkylstyrene, as the inner liner. However, decrease in air permeability is insufficient with this inner liner, therefore unsuitable for obtaining lightweight tires.

Also, JP-A-8-259741, JP-A-11-199713, JP-A-2000-63572, JP-A-2000-159936 and JP-A-2000-160024 suggest using a rubber composition obtained by mixing or dynamically crosslinking an elastomer and polyamide resin, polyester resin, polynitrile resin, cellulose resin or fluororesin and imide resin as the inner liner. However, in such rubber compositions, following deformation of other rubber material was extremely difficult, when processing by molding a tire or vulcanizing, and cracks developed when running.

SUMMARY OF THE INVENTION

As described above, various suggestions have been made regarding using a composition with low air permeability for the inner liner but are yet to be realized.

Therefore, the object of the present invention is to provide a pneumatic tire in which pressure maintaining properties are significantly improved. That is, the present invention aims to provide a pneumatic tire in which air permeability is significantly decreased.

Also, the present invention aims to provide a lightweight pneumatic tire without losing the pressure maintaining properties of the pneumatic tire.

Furthermore, the present invention aims to find a means to significantly improve adhesion between the materials, which is a problem when resin with low air permeability and a gas barrier layer are laminated to the rubber composition for the tire.

As a result of intensive studies to solve the above problems, the air permeability of a pneumatic tire was found to be significantly decreased by forming a gas barrier layer comprising an inorganic layered compound having a specific particle size and aspect ratio and resin, on the inner face of the tire body of a tubeless tire and the present invention was achieved.

That is, the present invention relates to a tubeless tire wherein an air chamber is formed between an inner face of a tire body and a rim thereof, by mounting the tire body to the periphery of the rim, and a gas barrier layer comprising a gas barrier resin composition containing an inorganic layered compound having a particle size of at most 5 μm and an aspect ratio of 50 to 5000 and a resin is formed on the inner face of the tire body.

Another embodiment of the present invention relates to a tubeless tire comprising a gas barrier layer on the inner face of an inner liner layer, wherein the inner liner layer comprises a rubber composition containing as rubber components, 60 to 100% by weight of at least one kind of butyl rubber selected from the group consisting of butyl rubber, halogenated butyl rubber and a halogenated copolymer of isomonoolefin having 4 to 7 carbon atoms and paraalkylstyrene, and 0 to 40% by weight of at least one kind of diene rubber selected from the group consisting of natural rubber, isoprene rubber, styrene-butadiene rubber, butadiene rubber and styrene-isoprene-butadiene rubber.

The above tubeless tire preferably has a gas barrier layer on the inner face of the inner liner layer via an anchor coat layer. Also, the inner liner layer preferably comprises a rubber composition contains an inorganic layered compound, having a particle size of at most 5 μm and an aspect ratio of 50 to 5000 which is dispersed in the rubber component, an inorganic filler represented by $nM.xSiOy.zH_2O$ (herein n represents an integer of 1 to 5, M represents at least one metal selected from Al, Mg, Ti and Ca, or metal oxide, metal hydroxide or metal carbonate thereof, x represents an integer of 0 to 10, y represents an integer of 2 to 5 and z represents an integer of 0 to 10) and a silane coupling agent.

Furthermore, another embodiment of the present invention relates to a tubeless tire having a gas barrier layer on the inner face of the carcass layer, in which the carcass layer comprises a rubber composition containing an inorganic layered compound, having a particle size of at most 5 μm and an aspect ratio of 50 to 5000 which is dispersed in the rubber component, an inorganic filler represented by $nM.xSiOy.zH_2O$ (herein n represents an integer of 1 to 5, M represents at least one metal selected from Al, Mg, Ti and Ca, or metal oxide, metal hydroxide or metal carbonate thereof, x represents an integer of 0 to 10, y represents an integer of 2 to 5 and z represents an integer of 0 to 10) and a silane coupling agent.

In the above embodiments, the resin is preferably high hydrogen bond resin such as polyvinyl alcohol and the gas barrier layer is preferably laminated as a coating film.

DETAILED DESCRIPTION

Hereinafter, the embodiments of the present invention are described in detail based on drawings.

Figure 2:
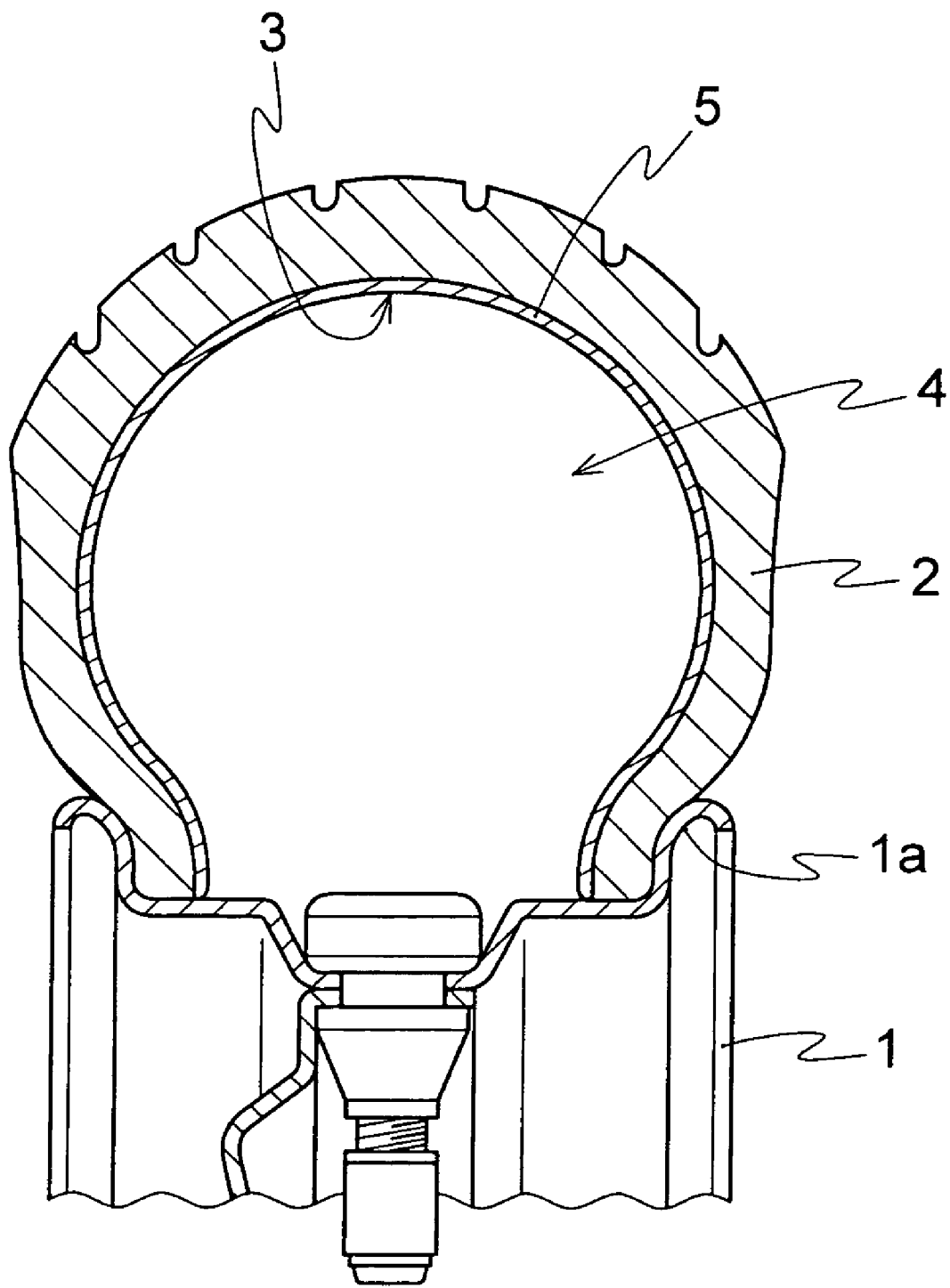
FIG. 2 is a cross sectional view depicting the relevant parts of a conventional tubeless tire when mounted on the rim.

As shown in FIG. 2, the basic structure of a conventionally known tubeless tire used in automobiles and autocycles is a structure in which tire body 2, which is mounted to the periphery 1a of rim 1, directly forms air chamber 4 between inner face 3 thereof and rim 1. In many cases, inner liner 5 comprising, for example, butyl rubber is formed on the inner face of the tire body.

Figure 1:
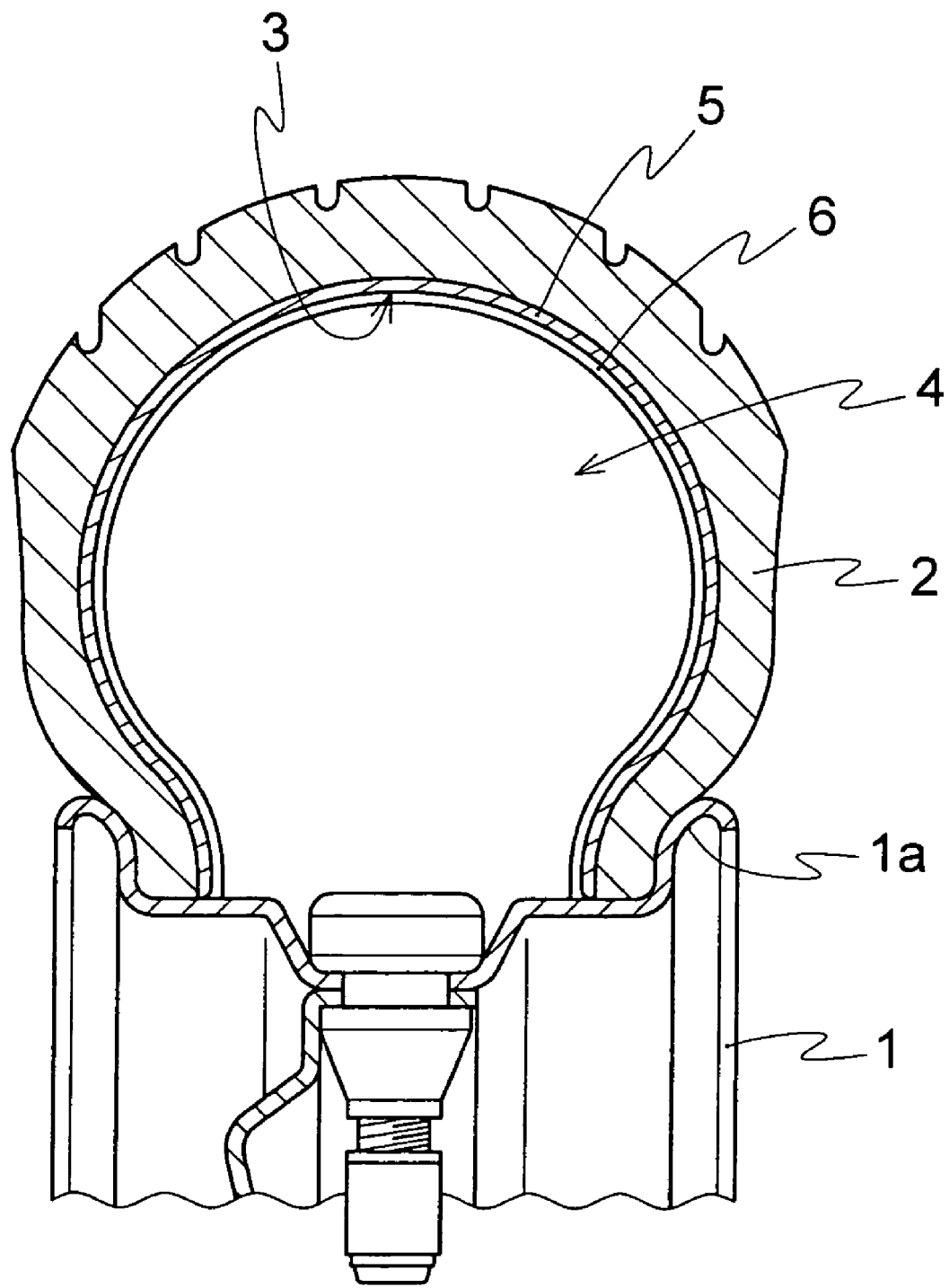
FIG. 1 is a cross sectional view depicting the relevant parts of the tubeless tire of the present invention when mounted on the rim.

As shown in FIG. 1, the tubeless tire of the present invention is basically the same as the conventional tubeless tire shown in FIG. 2, except that a specific gas barrier layer is laminated as coating film 6 to the inner face of the tire body. The structure of the tire body is not particularly limited and so the inner liner shown in FIG. 2 is not necessarily a requirement.

In the present invention, the inner face of the tire body refers to the inside surface of the tire body, which contacts with the air chamber when the tire body is mounted to the periphery of the rim. In a case such as the above, where another layer such as an inner liner is formed on the inner face, the inner face of the tire body refers to the inside surface of the tire body, which contacts with air chamber 4, including such layers.

<Gas Barrier Layer>

The tubeless tire of the present invention has a gas barrier layer comprising a gas barrier resin composition containing an inorganic layered compound and resin. The gas barrier layer refers to a layer with low air permeability and can decrease the air permeability of the tire.

The inorganic layered compound refers to an inorganic compound having a layered structure, in which unit crystal layers are piled on each other.

The average particle size of the inorganic layered compound used in the gas barrier resin composition of the present invention is at most 5 μm, preferably at most 1 μm. When the average particle size is more than 5 μm, processability when preparing tires decreases and also, air permeability is not decreased. Herein, the average particle size refers to the average value of the length of the inorganic layered compound.

The average aspect ratio of the inorganic layered compound is 50 to 5000 and more preferably is 200 to 3000, from the viewpoint that the effect of decreasing air permeability is particularly excellent. When the average aspect ratio is less than 50, decrease in air permeability is insufficient. Also, an inorganic layered compound with an average aspect ratio of more than 5000 is technically difficult to obtain and economically expensive. Herein, the average aspect ratio refers to the average value of the ratio of the length to the thickness of the inorganic layered compound.

The average particle size of the inorganic layered compound is found from the known method of diffracting/scattering within the dispersion medium (median size based on volume). That is, the average particle size is found by calculating the particle size dispersion, which is most consistent with the diffraction/scattering pattern obtained by passing light through the dispersion solution of the inorganic layered compound, by the Mie scattering theory.

In the case that the inorganic layered compound is sufficiently swelled and cleaved, in the same type of dispersion medium as the dispersion medium used in the method of diffracting/scattering, and then combined with resin, the particle size of the swelled and cleaved inorganic layered compound within the obtained resin composition is approximately the same as the particle size of the swelled and cleaved inorganic layered compound within the dispersion medium.

The aspect ratio (Z) of the inorganic layered compound is found from equation $Z=L/a$. Herein, L represents the average particle size of the inorganic layered compound which is found from the above method of diffracting/scattering and a represents the unit thickness of the inorganic layered compound, that is the thickness of the unit crystal layers of the inorganic layered compound. The "unit thickness a" of the inorganic layered compound can be found by the powder X-ray diffraction method ("Introduction to Mechanical Analysis (a)", (1985, Kagakudojin Co., Ltd., edited by Jiro Shiokawa), cf. page 69).

The aspect ratio (Z) found in the above manner is not necessarily exactly equal to the true aspect ratio of the inorganic layered compound within the gas barrier layer. However, this aspect ratio (Z) is assumed to be the aspect ratio of the inorganic layered compound within the gas barrier layer.

In the present invention, "aspect ratio" of the inorganic layered compound refers to the "aspect ratio (Z)" defined above and "average particle size" refers to the "average particle size (L) found from the method of diffracting/scattering".

Examples of the inorganic layered compound are various compounds described in JP-A-7-247374 such as graphite, phosphate derivative compounds (zirconium phosphate compound), chalcogenides and clay minerals. Chalcogenides are dichalcogenides of an element selected from group IV (Ti, Zr, Hf), group V (V, Nb, Ta) and group VI (Mo, W) of the periodic table and are compounds represented by the formula $MX_2$. In the formula, M represents an element selected from the above groups IV to VI and X represents chalcogen (S, Se, Te).

As an inorganic layered compound having a large aspect ratio, an inorganic layered compound which is swelled and cleaved in a solvent is preferably used. Of these, a clay mineral having swellability is preferable. Clay minerals are divided into a two-layer structure type, in which an octahedron layer with aluminum or magnesium as the center metal is above a tetrahedron layer of silica and a three-layer structure type, in which an octahedron layer with aluminum or magnesium as the center metal is sandwiched on both sides by a tetrahedron layer of silica. Examples of the former are kaolinites and antigorites. Examples of the latter are smectites, vermiculites and micas, depending on the number of kaotine between the layers. More specific examples are kaolinite, dickite, nacrite, halloysite, antigorite, chrysotile, pyrophyllite, montmorillonite, hectorite, tetrasilylic mica, sodium taeniolite, white mica, margarite, talc, vermiculite, phlogopite, xanthophylite and chlorite. Of these, in view of cost and dispersability, tetrasilylic mica is preferable.

Of the above clay minerals, smectites, vermiculites and micas are preferable and smectites are particularly preferable. Examples of preferable smectite clay minerals are montmorillonite, beidelite, nontronite, saponite, sauconite, stevensite, hectorite and these clay minerals which are treated with an organic material (hereinafter may be referred to as organically modified clay minerals).

The gas barrier resin composition used in the present invention is usually prepared as a dispersion solution comprising resin, the inorganic layered compound and a dispersion medium. The inorganic layered compound is preferably a compound which is swelled and/or cleaved within the dispersion medium. More specifically, a compound having a swelling value of at least 5 according to the following swellability test is preferable and a swelling value of at least 20 is more preferable. Also, a compound having a cleaving value of at least 5 according to the following cleavability test is preferable and a cleaving value of at least 20 is more preferable.

(Swellability Test)

A 100 ml graduated cylinder was charged with 100 ml of a solvent. Then, 2 g of an inorganic layered compound was gradually added. After leaving for 24 hours at 23° C., the volume (ml) of the inorganic layered compound dispersion layer is read from the graduation of the boundary between the inorganic layered compound dispersion layer and the supernatant in the above graduated cylinder. The larger this number value (swelling value) is, the larger the swellability is.

(Cleavability Test)

30 g of the inorganic layered compound was gradually added to 1500 ml of a solvent. After dispersing for 90 minutes at 23° C. at a peripheral speed of 8.5 m/minute using a diperser (made by Asada Iron Works Co., Ltd., Desva MH-L, blade diameter 52 mm, rotational speed 3100 rpm, volume of vessel 3 L, distance between bottom face and blade 28 mm), 100 ml of the dispersion solution was added to a graduated cylinder. After leaving for 60 minutes, the volume (ml) of the inorganic layered compound dispersion layer is read from the graduation of the boundary between the inorganic layered compound dispersion layer and the supernatant in the above graduated cylinder. The larger this number value (cleaving value) is, the larger the cleavability is.

Examples of the solvent by which the inorganic layered compound is swelled and/or cleaved is not particularly limited, but in the case of natural swellable clay minerals, examples are water, alcohol such as methanol, ethanol, propanol, isopropanol, ethylene glycol and diethylene glycol, dimethylformamide, dimethyl sulfoxide and acetone. Of these, water, alcohol such as methanol and a mixture of water and alcohol is preferable.

In the case that the inorganic layered compound is an organically modified clay mineral, examples of the dispersion medium are aromatic hydrocarbon such as benzene, toluene and xylene, ether such as ethyl ether and tetrahydrofurane, ketone such as acetone, methyl ethyl ketone and methyl isobutyl ketone, aliphatic hydrocarbon such as n-pentane, n-hexane and n-octane, halogenated hydrocarbon such as chlorobenzene, carbon tetrachloride, chloroform, dichloromethane, 1,2-dichloroethane and perchloroethylene, ethyl acetate, methyl methacrylate (MMA), dioctyl phthalate (DOP), dimethyl formamide, dimethyl sulfoxide, methyl Cellosolve and silicon oil.

The resin used in the gas barrier resin composition of the present invention is not particularly limited, but examples are polyvinyl alcohol (PVA), ethylene-vinyl alcohol copolymer (EVOH), polyvinylidene chloride (PVDC), polyacrylonitrile (PAN), polysaccharide and polyacrylic acid and esters thereof. A preferable example is high hydrogen bond resin having a hydrogen bond group or an ionic group, which is a crosslinkable functional group. The weight percentage of the hydrogen bond group or the ionic group (when both are included, the total of both) per weight unit of the high hydrogen bond resin is usually 20 to 60%, more preferably 30 to 50%. When the weight percentage of the hydrogen bond group or the ionic group is less than 20%, sufficient dispersability of the inorganic layered compound may not be obtained and when the weight percentage is more than 60%, moisture resistance of the resin after forming into the gas barrier layer tends to be poor. The amount of the hydrogen bond group or the ionic group can be measured by nuclear magnetic resonance (e.g. $^1$H-NMR, $^{13}$C-NMR).

Examples of the hydrogen bond group of the hydrogen bond resin are hydroxyl group, amino group, thiol group, carboxyl group, sulfonic acid group and phosphoric acid group. Examples of the ionic group are a carboxylate group, sulfonic acid ion group, phosphoric acid ion group, ammonium group and phosphonium group. Of these, a preferable hydrogen bond group or ionic group is hydroxyl group, amino group, carboxyl group, sulfonic acid group, carboxylate group, sulfonic acid ion group and ammonium group.

Examples of the high hydrogen bond resin are polyvinyl alcohol and modified substances thereof, ethylene-vinyl alcohol copolymer and modified substances thereof, polysaccharide such as hydroxymethyl cellulose, hydroxyethyl cellulose, carboxymethyl cellulose, amylose, amylopectin, pullulan, curdlan, xanthan, chitin, chitosan and cellulose, polyacrylic acid and esters thereof, sodium polyacrylate, polybenzene sulfonic acid, polybenzene sodium sulfonate, polystyrene sulfonic acid, polystyrene sodium sulfonate, polyethylene imine, polyallyl amine and ammonium salt thereof, polyvinyl thiol and polyglycerin.

Of the above high hydrogen bond resin, polyvinyl alcohol and modified substances thereof, polysaccharide, EVOH and modified substances thereof are preferable, in view of barrier properties.

Herein, polyvinyl alcohol refers to a polymer obtained by hydrolyzing the acetate part of a vinyl acetate copolymer or a polymer obtained by hydrolyzing a trifluoro vinyl acetate copolymer, a vinyl formate copolymer, a vinyl pivalate copolymer, a t-butyl vinyl ether polymer or a trimethylsilyl vinyl ether polymer. To be precise, the polyvinyl alcohol is a copolymer of vinyl alcohol and vinyl acetate.

Examples of the modified PVA are polyvinyl alcohol resin modified with at least one compound having a silyl group within the molecule described in JP-A-3-93542.

The hydrolyzation degree of PVA is preferably at least 70%, more preferably at least 85%, further preferably at least 98% by mole percentage. Most preferably, the PVA is completely hydrolyzed. The polymerization degree is preferably 100 to 20,000, more preferably 200 to 5,000, further preferably 100 to 5,000. The PVA can also be modified with a small amount of a copolymerized monomer.

The ethylene-vinyl alcohol copolymer (EVOH) preferably has a vinyl alcohol content of at least 40% by mole, more preferably at least 41% by mole, and at most 80% by mole. EVOH with a vinyl alcohol content within the range of 45 to 75% by mole is particularly preferable. The melt index (MI) of the EVOH is not particularly limited but is preferably 0.1 g/10 minutes to 50 g/10 minutes, under conditions of a temperature of 190° C. and a load of 2.160 g.

Polysaccharide refers to biopolymers synthesized in a biological system by condensation polymerization of various monosaccharides and also includes such biopolymers which are chemically modified. Examples are cellulose, cellulose derivatives such as hydroxymethyl cellulose, hydroxyethyl cellulose and carboxymethyl cellulose, amylose, amylopectin, pullulan, curdlan, xanthan, chitin and chitosan.

The high hydrogen bond resin may be used alone, but may also be made into a copolymer with another copolymerizable monomer or used together with other blendable resin, provided that the gas barrier properties are not influenced. Examples of resin which can be used are polyester resin, polyurethane resin, polyamide resin, epoxy resin and melamine resin.

Also, a crosslinking agent which can crosslink with the high hydrogen bond resin can be added to the high hydrogen bond resin. The amount of the crosslinking agent is not particularly limited and an effective amount of the crosslinking agent can be used. As the crosslinking agent, an organic metal compound is particularly suitable, as a crosslinked structure can be imparted to the high hydrogen bond resin while maintaining flexibility. Herein, an organic metal compound is a compound which can crosslink with the high hydrogen bond resin and form a coordination bond, hydrogen bond or ion bond.

Suitable examples of the metal compound are various metal alcoxides, organic compounds of titanium, organic compounds of zirconium, organic compounds of aluminum and organic compounds of silicon. Of these organic metal compounds, a chelate compound, for example an organic metal compound, such as acetylacetonato, having a chelate ligand which can form a coordination bond with high hydrogen bond resin, is suitable in view of crosslinking reactivity.

As the silicon organic compound, a silane coupling agent is preferably used. As the silane coupling agent, organoalcoxysilane containing an organic reactive group, particularly organoalcoxysilane containing an epoxy group, is suitable. More specific examples are γ-glycidoxy propyl trimethoxysilane, γ-glycidoxy propyl methyl diethoxysilane and β-(3,4-epoxycyclohexyl)ethyl trimethoxysilane. The silane coupling agent may be only one type or at least two types may be combined. Using together with metal alcoxide is also preferable.

Also, other organic crosslinking agents such as aldehyde-type crosslinking agents including formaldehyde, acetaldehyde and glyoxal, epoxy-type crosslinking agents including water-soluble multi-functional epoxy, isocyanate-type crosslinking agents including multi-functional isocyanate compounds and melamine-type crosslinking agents such as methylolmelamine.

The method for crosslinking the high hydrogen bond resin using a crosslinking agent is, for example, the method according to the method of JP-A-8-99390. That is, crosslinking can be effectively conducted by the method of preparing the coating solution to become the gas barrier layer by mixing the organic metal compound, high hydrogen bond resin, a sol-gel process catalyst, acid and solvent, applying the solution to the base material layer, drying the layer and advancing polycondensation reaction in the drying phase.

When the above resin is used as the solution, the solvent is not particularly limited and examples are water, alcohol, dimethylformamide and acetone. In view of processability and safety, water and alcohol are preferable.

The composition ratio of the inorganic layered compound and the resin used in the present invention is preferably 5/95 to 90/10, more preferably 5/95 to 50/50, in volume ratio. Also, the composition ratio is usually 3/97 to 70/30 in weight ratio. When the amount of the inorganic layered compound is too small, decrease in air permeability is insufficient and when the amount is too large, film forming properties are unfavorable and the gas barrier layer tends to become brittle.

In the gas barrier resin composition containing the inorganic layered compound and resin, various additives such as an ultraviolet ray absorbent, a coloring agent, an antioxidant and a surfactant may be included, as long as the tubeless tire is not adversely affected. The above surfactant is not particularly limited but examples are an anionic surfactant, a cationic surfactant, an amphoteric surfactant and a nonionic surfactant.

The compounding method for the gas barrier composition containing the inorganic layered compound and resin is not particularly limited, but the methods of preparing the coating solution by adding the inorganic layered compound and resin to the solvent (dispersion medium) either separately or after mixing together in advance, can be used. Examples are the method of mixing the resin or a solution in which resin is dissolved and the dispersion solution by which the inorganic layered compound is swelled and cleaved in advance, the method of adding the dispersion solution by which the inorganic layered compound is swelled and cleaved to the resin, and the method of adding the inorganic layered compound to a solution obtained by dissolving resin in a solvent. Also, the method of thermally kneading the resin and the inorganic layered compound can also be used. The two former methods are preferable as methods for obtaining a composition containing an inorganic layered compound having a particularly large aspect ratio.

As the solvent (dispersion medium) for preparing the coating solution, examples are the dispersion mediums, which are used when swelling and/or cleaving the inorganic layered compound and water, alcohol or a mixture of water and alcohol are particularly preferable. The amount of the dispersion medium is determined according to conditions such as the type of dispersion medium, coating conditions such the coating method and the desired thickness of the gas barrier layer and is not particularly limited.

In the method for preparing the coating solution, the inorganic layered compound is preferably dispersed within the coating solution as finely and homogeneously as possible and as a method to do so, high-pressure dispersion treatment, which is known as a dispersion method for preparing a coating solution, is preferably conducted.

The method for laminating the gas barrier layer used in the present invention to the inner face of the tire is not particularly limited. Examples are the coating method of applying the coating solution for the gas barrier layer to the surface of the base material, removing the solvent from the system by drying and then conducting thermal treatment and the method of laminating the gas barrier layer to the base material afterwards. Of these, the coating method is preferable in view of processability.

Examples of the method for coating the base material are the method of applying the coating solution to the inner face of a tire body molded to a specific shape, to become the desired thickness by spraying or brushing and then removing the solvent and the method of applying the coating solution to the tire material before imparting a tire shape, by the usual methods using a roll coater, slit coater or bar coater, removing the solvent and then molding into a tire shape. Also, the method of applying the coating solution to the inner face side of the inner liner layer of the tire before vulcanization and the method of applying the coating solution to the tire after vulcanization can also be used.

The thickness of the gas barrier layer obtained by the coating method is usually at least 0.01 μm, preferably at least 0.1 μm, more preferably at least 0.5 μm, most preferably at least at least 1 μm. Also, the thickness of the gas barrier layer is preferably at most 0.5 mm, more preferably at most 100 μm. When the thickness of the gas barrier layer is more than 0.5 mm, the gas barrier layer tends to crack due to change in shape of the tire when running. Also, when the gas barrier layer is thinner than 0.5 μm, the effect of decreasing air permeability tends to be small. In the tubeless tire of the present invention, because the gas barrier layer is a thin film, the gas barrier layer can sufficiently follow deformation of the material, which occurs when driving the tire, and cracks do not occur.

The thickness of the coating film does not necessarily need to be even on the inner face of the tire and may be changed according to the structure of the tire, for example relatively thin on the tire tread part and thick on the side wall and bead area. Also, the coating film may comprise one layer only or a multi-coating structure having a plurality of layers, when necessary.

<Base Material>

The base material to which the gas barrier layer is laminated can be the inner liner layer as shown in FIG. 1.

The rubber composition in the inner liner layer (rubber composition for the inner liner) preferably contains 60 to 100% by weight, more preferably 70 to 100% by weight, of butyl rubber within the rubber component as the rubber component. When the proportion of butyl rubber within the rubber component is less than 60% by weight, air permeability may not be sufficiently decreased.

The butyl rubber contains at least one kind of rubber selected from the group consisting of butyl rubber (IIR), halogenated butyl rubber (X-IIR) and a a halogenated copolymer of isomonoolefin having 4 to 7 carbon atoms and paraalkylstyrene. Examples of the halogen in the halogenated butyl rubber and halogenide are preferably chlorine and bromine. Of these butyl rubbers, X-IIR and a halogenated copolymer of isomonoolefin having 4 to 7 carbon atoms and paraalkylstyrene are preferable, as adhesion with the lower layer is particularly excellent, and of these, a halogenated copolymer of isomonoolefin having 4 to 7 carbon atoms and paraalkylstyrene is more preferable.

The rubber component other than the butyl rubber is diene rubber. The diene rubber is preferably included in an amount of 0 to 40% by weight, more preferably 0 to 30% by weight, within the rubber component. When the proportion of the diene rubber within the rubber component is more than 40% by weight, the proportion of butyl rubber decreases and as a result, air permeability may not be sufficiently decreased.

The diene rubber contains at least one kind of diene rubber selected from the group consisting of natural rubber (NR), isoprene rubber (IR), styrene-butadiene rubber (SBR), butadiene rubber (BR) and styrene-isoprene-butadiene rubber (SIBR). Of these, NR is preferable in view of strength.

The rubber composition for the inner liner preferably contains 0.5 to 20 parts by weight, more preferably 1 to 10 parts by weight, of the inorganic layered compound also used in the gas barrier resin composition, based on 100 parts by weight of the rubber component. When the amount is less than 0.5 parts by weight, sufficiently low air permeability may not be achieved. When the amount is more than 20 parts by weight, the rubber becomes too hard and the inner liner may not be able to follow the deformation when molding and running.

In the present invention, the inorganic layered compound included in the rubber composition for the inner liner is preferably organically treated. Here, organic treatment refers to ion exchange treatment by a quaternary ammonium. Examples of the quaternary ammonium are dimethyl dihydrogenated tallow quaternary ammonium, dimethyl dihydrogenated tallow 2-ethylhexyl quaternary ammonium and dimethyl benzylhydrogenated tallow quaternary ammonium. Of these, in view of cost, dimethyl dihydrogenated tallow quaternary ammonium is preferable.

In the present invention, the inorganic layered compound is finely dispersed within the rubber component. Herein, the state in which the inorganic layered compound is finely dispersed refers to the layered filler being exfoliated in the inorganic layered compound. More specifically, the state refers to the 6° peak being destroyed, when directly observed by a transmission electron microscope (TEM) or X-ray diffraction of a rubber composition containing layered silicate is attempted.

The rubber composition for the inner liner in the present invention preferably contains an inorganic filler represented by $nM \cdot xSiO_y \cdot zH_2O$ (herein n represents an integer of 1 to 5, M represents at least one metal selected from Al, Mg, Ti and Ca, or metal oxide, metal hydroxide or metal carbonate thereof, x represents an integer of 0 to 10, y represents an integer of 2 to 5 and z represents an integer of 0 to 10). Examples of the inorganic filler are inorganic powder such as silica, calcium carbonate, magnesium carbonate, aluminum hydroxide, magnesium hydroxide, alumina, clay, talc and magnesium oxide and these can be used alone or together. The compounding amount of the inorganic filler represented by $nM \cdot xSiO_y \cdot zH_2O$ is preferably at least 10 parts by weight, more preferably 10 to 80 parts by weight, based on 100 parts by weight of the rubber component. When the amount is less than 10 parts by weight, the desired adhesion with the resin may not sufficiently be obtained and when the amount is more than 80 parts by weight, processability becomes poor.

Furthermore, the rubber composition for the inner liner of the present invention may contain a silane coupling agent. Examples of the silane coupling agent are bis(3-triethoxysilylpropyl)tetrasulfide, bis(3-triethoxysilylpropyl)disulfide, bis(triethoxysilylpropyl)disulfide, triethoxysilylpropylisocyanate, vinyltriethoxysilane, vinyltrimethoxysilane, γ-methacryloxypropyltrimethoxysilane, γ-methacryloxypropylmethyldimethoxysilane, γ-glycidoxypropylmethyldiethoxysilane, γ-mercaptopropyltrimethoxysilane, γ-(polyethyleneamino)-propyltrimethoxysilane, N-β-(aminoethyl)-γ-aminopropyltrimethoxysilane and N'-vinylbenzyl-N-trimethoxysilylpropylethylenediamine salt. These may be used alone or two or more kinds may be used in combination. Of these, bis(3-triethoxysilylpropyl)tetrasulfide is preferable in view of both the effects of adding a silane coupling effect and cost.

The compounding amount of the silane coupling agent is preferably 1 to 20% by weight, more preferably 5 to 15% by weight, of the amount of the inorganic filler. When the amount of the silane coupling agent is less than 1% by weight, the bond between the inorganic filler and the rubber tends to become weak and the heat generated when used in a tire tends to increase. When the amount is more than 20% by weight, the coupling agent is only added in excess and the cost tends to become high.

To the rubber composition for the inner liner of the present composition, the usual additives used in a rubber compound for tires such as carbon black, a plasticizer including chemical oil, a tackifier, sulfur, a crosslinking agent including zinc, a vulcanization accelerator and a crosslinking aid may be compounded accordingly.

The base material to which the gas barrier layer is laminated can also be a carcass layer. In such a case, the inner liner is preferably not formed.

The rubber composition in the carcass layer (rubber composition for the carcass) may have the same composition as the rubber composition for the inner liner. However, the compounding ratio of the diene rubber and butyl rubber is preferably 0 to 60% by weight of butyl rubber, more preferably 10 to 50% by weight, most preferably 20 to 40% by weight. When the amount of butyl rubber is more than 60% by weight, adhesion and durability as carcass rubber tends to be insufficient.

In order to decrease air permeability, the inside rubber must be improved rather than the carcass cord. Therefore, in view of durability, preferably, conventional rubber is used for one side (outside) of the carcass layer and the above rubber composition for a carcass is used only for the inner face side of the carcass layer. As a result, not only can decrease in durability be prevented but also a carcass rubber having an extremely large content of butyl rubber with low air permeability can be applied.

<Anchor Coat Layer>

When applying the coating solution to the surface of the base material, subjecting the surface to be coated to surface treatment such as anchor treatment, corona treatment, flame plasma treatment, ozone treatment and electron beam treatment is effective for improving adhesion with the coated surface. For example, as the anchor treatment, an anchor coat layer can be formed on the inner face of the inner liner layer.

The anchor coat layer is the layer between the inner liner layer and the gas barrier layer containing the inorganic layered compound and resin and adheres to both the inner liner layer and the gas barrier layer. Therefore, the anchor coat layer is laminated between the inner liner layer and the gas barrier layer. The method for laminating can be a conventionally known method used when forming the gas barrier layer and although not particularly limited, the process of coating with an anchor coating solution, obtained by dissolving an anchor coating in a solvent is preferable.

As the anchor coating, at least one type selected from the group consisting of polyethylene imine anchor coating, alkyl titanate anchor coating, polybutadiene anchor coating, polyurethane anchor coating and ionomer anchor coating is preferable. Of these, a polyurethane anchor coating is preferable in view of excellent adhesion to rubber and water resistance.

The polyurethane anchor coating is prepared from an isocyanate compound and an active hydrogen compound.

Examples of the isocyanate compound are tolylene diisocyanate (TDI), 4,4'-diphenylmethane diisocyanate (MDI), xylylene diisocyanate (XDI), hexamethylene diisocyanate (HDI), 4,4'-methylenebiscyclohexyl isocyanate (H12MDI) and isophorone diisocyanate (IPDI).

The active hydrogen compound has a functional group for bonding with the diisocyanate compound and examples are low molecular weight polyols such as ethylene glycol, diethylene glycol, dipropylene glycol, 1,4-butanediol, 1,6-hexanediol, neopentylglycol and trimethylolpropane, polyether polyols such as polyethylene glycol, polyoxypropylene glycol, copolymer of ethyleneoxide and propylene oxide and polytetramethyleneether glycol and polyester polyols of polyester obtained from poly-β-methyl-δ-valerolactone, polycaprolactone or diol/dibasic acid.

Of the above active hydrogen compounds, low molecular weight polyol is preferable and low molecular weight diol is particularly preferable. Examples of the diol are ethylene glycol, diethylene glycol, dipropylene glycol, 1,4-butanediol, 1,6-hexanediol and neopentylglycol. Examples of the above dibasic acid are adipic acid, azelaic acid, sebatic acid, isophthalic acid and terephthalic acid. Examples of other polyols are active hydrogen compounds such as castor oil, liquid polybutadiene, epoxy resin, polycarbonate diol, acryl polyol and Neoprene™.

The compounding ratio of the isocyanate compound and the active hydrogen compound is not particularly limited, but the compounding ratio is preferably determined in consideration of the equivalent relationship between the isocyanate group and the active hydrogen group, for example —OH, —NH and —COOH. For example, the mole ratio R of the mole number of the isocyanate groups (AN) and the mole number of the active hydrogen groups of the active hydrogen compound (BN) (R=AN/BN) is preferably at least 0.001 in view of adhesion strength and preferably at most 10 in view of adhesion and blocking. Further preferably, this ratio of mole number R is within the range of 0.001 to 1. The mole number of the isocyanate groups and active hydrogen groups can be quantified by $^1$H-NMR and $^{13}$C-NMR.

The solvent in the anchor coating solution is mainly an organic solvent and examples are alcohol, aliphatic hydrocarbon, alicyclic hydrocarbon, aromatic hydrocarbon, ester, ketone, ether halogenated hydrocarbon and mixtures thereof.

The thickness of the anchor coat layer is preferably at least 0.03 μm, more preferably at least 0.05 μm, further preferably 0.1 μm, most preferably at least 0.5 μm. Also, thickness is preferably at most 500 μm, more preferably at most 100 μm, further preferably at most 2.0 μm, most preferably at most 1.0 μm. When the thickness of the anchor coat layer is less than 0.1 μm, sufficient adhesion may not to be obtained and when the thickness is more than 500 μm, exfoliation in the anchor coat layer tends to occur.

<Protective Layer>

The tubeless tire of the present invention comprises a gas barrier layer laminated on the inner face of the tire body. However, the gas barrier layer does not necessarily need to be the topmost layer on the inner face of the tire body and a protective layer may further be formed on the surface of the laminated gas barrier layer when necessary. As a result, possible damage of the coating film when mounting the tire body on the periphery of the rim can be prevented. In such a case, the protective layer does not necessarily need to be on the entire surface of the gas barrier layer and can be partially formed on only the inner face of the peripheral area of the tire to be mounted on the rim.

The protective layer is not particularly limited as long as the film has adhesion to the coating film and a certain degree of mechanical strength. Because some unevenness in adhesion is acceptable, a film may be laminated but a protective layer, which can be coated on the coating layer by a resin dispersion solution or a resin solution in the same manner as the first coating film, is preferable.

The present invention is explained in detail based on Examples below, but the present invention is not limited thereto.

<Process for Preparing Coating Solution for Gas Barrier Layer>

Coating Solution 1

Synthetic mica (tetrasilylic mica (Na-Ts); available from Topy Industries, Limited) was dispersed in ion exchanged water so as to become 0.65% by weight to obtain an inorganic layered compound dispersion solution (solution A). The average particle size of the synthetic mica (Na-TS) was 977 nm and the average aspect ratio was 1043. Polyvinyl alcohol (PVA210; available from Kuraray Co., Ltd., weight percentage of hydrogen bond groups or ionic groups per weight unit of resin: 38%, hydrolyzation degree: 88.5%, polymerization degree: 1000) was dissolved in ion exchanged water so as to become 0.325% by weight to obtain a resin solution (solution B). Solution A and solution B were mixed so that the respective solid content ratio (volume ratio) was inorganic layered compound/resin=3/7 to obtain coating solution 1 for the gas barrier layer.

Coating Solution 2

The same polyvinyl alcohol (PVA210; available from Kuraray Co., Ltd.) as that used in coating solution 1 for the gas barrier layer was dissolved in ion exchanged water so as to become 0.325% by weight to obtain coating solution 2 for the gas barrier layer.

<Preparation of Rubber Composition>

Each sample rubber composition (rubber composition A to Y) was prepared with the materials and processing methods described below.

(Materials)

NR: RSS #3 available from Tech Bee Hang Co., Ltd.
Br-IIR: Exxon Bromobutyl 2255
Sodium-bentonite: Kunipia F (clay-type mineral with a primary particle size of 100 to 2000 nm, average aspect ratio of 320 and swellability of at least 45 ml/2 g) available from Kunimine Industries
GPF: Seast V available from Tokai Carbon Co., Ltd.
HAF: Diablack H available from Mitsubishi Chemical Corporation
Silica: Ultrasil VN3 ($N_2SA$: 210 $m^2/g$) available from Degussa Co.
Silane coupling agent: Si69 (bis(3-triethoxysilylpropyl)tetrasulfide) available from Degussa Co.
Resin: ESCOREZ 1102 available from Esso
Oil A: JOMO Process X-140 available from Japan Energy Corporation
Oil B: Machine oil 22 available from Showa Shell Sekiyu K.K.
Stearic Acid: Stearic acid available from NOF Corporation
Zinc oxide: Zinc Oxide Type 1 available from Mitsui Mining and Smelting Co., Ltd
Sulfur: powdery sulfur available from Tsurumi Chemicals Co., Ltd.
Vulcanization Accelerator NS: Nocceler NS(N-tert-butyl-2-benzothiazylsufenamide), available from Ouchi Shinko Chemical Industrial Co., Ltd.
Vulcanization Accelerator DM: Nocceler DM available from Ouchi Shinko Chemical Industrial Co., Ltd.
Vulcanization Accelerator D: Nocceler D (N,N'-diphenyl guanidine), available from Ouchi Shinko Chemical Industrial Co., Ltd.

(Processing Method)

According to the composition formula shown in Tables 1, 2 and 3, the materials other than sulfur, zinc oxide and the vulcanization accelerator were kneaded in a BR-type Banbury to prepare a master batch and then the master batch and sulfur, zinc oxide and the vulcanization accelerator were kneaded with an 8 inch roll to obtain each sample rubber composition (rubber composition A to Y). The obtained rubber composition was press vulcanized at 170° C. for 15 minutes to obtain a vulcanized object.

TABLE 1

| | Rubber Composition | | | | |
|---|---|---|---|---|---|
| | A | B | C | D | E |
| Composition (parts by weight) | | | | | |
| NR | 100 | 70 | 40 | 20 | — |
| Br-IIR | — | 30 | 60 | 80 | 100 |
| GPF | 50 | 50 | 50 | 50 | 50 |
| Resin | 2 | 2 | 2 | 2 | 2 |
| Oil A | 10 | 10 | 10 | — | — |
| Oil B | — | — | — | 10 | 10 |
| Stearic Acid | 2 | 2 | 2 | 2 | 2 |
| Zinc Oxide | 3 | 3 | 3 | 3 | 3 |
| Sulfur | 1.5 | 1.5 | 1.5 | 0.5 | 0.5 |
| Vulcanization Accelerator NS | 1 | 1 | 1 | 1 | 1 |
| Vulcanization Accelerator DM | — | — | — | 1 | 1 |

TABLE 2

| | Rubber Composition | | | | | | | | | |
|---|---|---|---|---|---|---|---|---|---|---|
| | F | G | H | I | J | K | L | M | N | O |
| Composition (parts by weight) | | | | | | | | | | |
| Natural Rubber | 100 | 100 | 40 | 40 | 40 | 40 | 40 | 40 | — | — |
| Br-IIR | — | — | 60 | 60 | 60 | 60 | 60 | 60 | 100 | 100 |
| GPF | 50 | 50 | 50 | 50 | 20 | 20 | — | — | 25 | 25 |
| Oil A | 10 | 10 | 10 | 10 | 10 | 10 | 10 | 10 | — | — |
| Oil B | — | — | — | — | — | — | — | — | 10 | 10 |
| Silica | — | — | — | — | 20 | 20 | 50 | 50 | 25 | 25 |
| Silane Coupling Agent | — | — | — | — | 2 | 2 | 5 | 5 | 3 | 3 |
| Resin | 2 | 2 | 2 | 2 | 2 | 2 | 2 | 2 | 2 | 2 |
| Sodium-bentonite | 0 | 5 | 0 | 5 | 0 | 5 | 0 | 5 | 0 | 5 |
| Stearic Acid | 2 | 2 | 2 | 2 | 2 | 2 | 2 | 2 | 2 | 2 |
| Zinc Oxide | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 0.5 | 0.5 |
| Vulcanization Accelerator NS | 1 | 1 | 1 | 1 | 1 | 1 | 1 | 1 | 1 | 1 |
| Vulcanization Accelerator D | — | — | — | — | 1 | 1 | 1 | 1 | 1 | 1 |

TABLE 3

| | Rubber Composition | | | | | | | | | | Inner Liner |
|---|---|---|---|---|---|---|---|---|---|---|---|
| | P | Q | R | S | T | U | V | W | X | Y | Composition |
| | Composition (parts by weight) | | | | | | | | | | |
| Natural Rubber | 100 | 100 | 40 | 40 | 40 | 40 | 40 | 40 | — | — | 50 |
| Br-IIR | — | — | 60 | 60 | 60 | 60 | 60 | 60 | 100 | 100 | 50 |
| HAF | 50 | 50 | 50 | 50 | 20 | 20 | — | — | 25 | 25 | 50 GPF |
| Sodium-bentonite | — | 5 | — | 5 | — | 5 | — | 5 | — | 5 | — |
| Oil A | 10 | 10 | 10 | 10 | 10 | 10 | 10 | 10 | — | — | 15 |
| Silica | — | — | — | — | 20 | 20 | 50 | 50 | 25 | 25 | — |
| Silane Coupling Agent | — | — | — | — | 2 | 2 | 5 | 5 | 3 | 3 | — |
| Resin | 2 | 2 | 2 | 2 | 2 | 2 | 2 | 2 | 2 | 2 | 2 |
| Oil B | — | — | — | — | — | — | — | — | 10 | 10 | — |
| Stearic Acid | 2 | 2 | 2 | 2 | 2 | 2 | 2 | 2 | 2 | 2 | 2 |
| Zinc Oxide | 3 | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 0.5 | 0.5 | 1.5 |
| Vulcanization Accelerator NS | 1 | 1 | 1 | 1 | 1 | 1 | 1 | 1 | 1 | 1 | 1 |
| Vulcanization Accelerator D | — | — | — | — | 1 | 1 | 1 | 1 | 1 | 1 | — |

EXAMPLES 1 TO 5 AND COMPARATIVE EXAMPLES 1 TO 10

<Evaluation as Rubber Composition>

A polyurethane anchor coating (Adocoat AD 335A/CAT10L=15/1 (weight ratio); available from Toyo Morton Co., Ltd.) was applied on the various vulcanized rubber compositions (rubber composition A to E) shown in Table 4. Then, after the various coating solutions for the gas barrier layer were formed into a film by casting, thermal treatment was conducted for 10 minutes at 100° C. The film thickness obtained by the treatment was approximately 1 μm for the anchor coat layer and approximately 2 μm for the gas barrier layer. The following air permeability evaluation was conducted with respect to the rubber. The results are shown in Table 4.

In each Example and Comparative Example, "1" indicates that coating solution 1 for the gas barrier layer was formed into a film, "2" indicates that coating solution 2 for the gas barrier layer was formed into a film and "-" indicates that neither anchor treatment was conducted nor a film was formed, in the gas barrier composition of Table 4.

(Air Permeability Evaluation)

The air permeability coefficient was measured according to JIS K7126 "Testing method of gas permeability of plastic films and sheets (method A)" with air as the test gas (nitrogen: oxygen=8:2) and 25° C. as the test temperature. The air permeability is decreased the lower the number value is.

The air permeability coefficient is preferably at most 30 ($\times 10^{-11}$ cc·cm/cm$^2$·sec·cmHg). More preferably, the air permeability coefficient is in the range of at most 20. When the air permeability coefficient is more than 30, low permeability may not to be obtained.

<Evaluation as Tire>

A 195/65R14 tire was prepared using the above rubber composition as the inner liner layer and then vulcanized.

The anchor coating and then the coating solution for the gas barrier layer were applied to the inner face of the inner liner layer of the vulcanized tire using a certain spray gun and then dried. Then, thermal treatment was conducted for 10 minutes at 100° C. The film thickness obtained by the treatment was approximately 1 μm for the anchor coat layer and approximately 2 μm for the gas barrier layer. The following evaluation of the rate of decrease in tire pressure was conducted with respect to the tire. The results are shown in Table 4.

(Evaluation of Rate of Decrease in Tire Pressure)

The above tire with an initial pressure of 100 kPa was left for 3 months in room temperature of 25° C. under a no-load condition and the pressure was measured every 4 days. When t is the number of days passed, $P_0$ is the initial pressure and $P_t$ is the pressure measured when t days have passed, the value of α is found by using function:

$$P_t/P_0 = \exp(-\alpha t).$$

The obtained α and t=30 were substituted into the following equation and β was obtained. The value of β was assumed to be the rate of decrease in pressure per month (%/month).

$$\beta = \{1 - \exp(-\alpha t)\} \times 100$$

The rate of decrease in pressure of the tire is preferably at most 2.5 (%/month). When more than 2.5%, decrease in tire pressure becomes noticeable.

TABLE 4

| | Ex. | | | | | Com. Ex. | | | | | | | | | |
|---|---|---|---|---|---|---|---|---|---|---|---|---|---|---|---|
| | 1 | 2 | 3 | 4 | 5 | 1 | 2 | 3 | 4 | 5 | 6 | 7 | 8 | 9 | 10 |
| Rubber Composition | C | D | E | A | B | A | A | B | B | C | C | D | D | E | E |
| Gas Barrier Layer Composition | 1 | 1 | 1 | 1 | 1 | — | 2 | — | 2 | — | 2 | — | 2 | — | 2 |
| Air Permeability Coefficient ($\times 10^{-11}$ cc·cm/cm$^2$·sec·cmHg) | 7 | 6 | 5 | 23 | 12 | 41 | 38 | 20 | 18 | 13 | 11 | 11 | 10 | 10 | 9 |
| Rate of Decrease in Pressure (%/month) | — | 1.8 | 1.7 | 3.1 | — | — | — | — | — | — | — | — | — | 2.3 | — |

In Comparative Examples 1 to 10, in which the coating solution for the gas barrier layer was not used or coating solution 2 for the gas barrier layer was used, the air permeability coefficient was high and unpreferable. Also, in Example 4, in which rubber composition A which does not contain butyl rubber was used, and in Example 5, in which rubber composition B which contains only a small amount of butyl rubber was used, the air permeability coefficient was high and unpreferable. On the other hand, in Examples 1 to 3, in which rubber compositions C to E and coating solution 1 for the gas barrier layer were used, the air permeability coefficient was low and excellent results were obtained.

Furthermore, in Comparative Example 9, in which a gas barrier layer was not formed, and in Example 4, in which rubber composition A which does not contain butyl rubber was used, the rate of decrease in tire pressure was high and unpreferable. On the other hand, in Examples 2 and 3, the rate of decrease in pressure is low and excellent results were obtained.

EXAMPLES 6 TO 15 AND COMPARATIVE EXAMPLES 11 TO 30

<Evaluation as Rubber Composition>

After coating solutions 1 or 2 were formed into a film by casting on the various rubber samples obtained by rubber compositions F to O, according to the compounding formula shown in Table 2, or without conducting film forming treatment, thermal treatment was conducted for 10 minutes at 100° C. The film thickness obtained by the treatment was approximately 5 µm. The air permeability evaluation was conducted with respect to the rubber. The results are shown in Table 5 and 6.

In each Example and Comparative Example, "1" indicates that coating solution 1 for the gas barrier layer was formed into a film, "2" indicates that coating solution 2 for the gas barrier layer was formed into a film and "-" indicates that a film was not formed, in the gas barrier composition of Tables 5 and 6.

<Evaluation as Tire>

A 195/65R14 tire was prepared using the above rubber composition as the inner liner layer and then vulcanized.

The coating solution for the gas barrier layer was applied to the inner face of the inner liner layer of the vulcanized tire using a certain spray gun and then dried. Then, thermal treatment was conducted for 10 minutes at 100° C. The film thickness obtained by the treatment was approximately 2 µm. The evaluation of the rate of decrease in tire pressure and the following pressure test and evaluation of appearance after testing with a tire machine were conducted with respect to the tire. The results are shown in Table 5 and 6.

(Pressure Test and Evaluation of Appearance after Testing with Tire Machine)

An indoor drum test was conducted using a specific tire under conditions of running speed of 80 km/hour, pressure of 190 kPa and load of 646 kg and the tire was run for 30,000 km. The appearance of the inner liner layer was checked for tears and wrinkles in the gas barrier layer thin film. Then, with respect to the tire, the test for the rate of decrease in tire pressure was conducted again.

TABLE 5

|  | Ex. | | | | | | | | | |
| --- | --- | --- | --- | --- | --- | --- | --- | --- | --- | --- |
|  | 6 | 7 | 8 | 9 | 10 | 11 | 12 | 13 | 14 | 15 |
| Rubber Composition | K | M | O | F | G | H | I | J | L | N |
| Gas Barrier Layer Composition | 1 | 1 | 1 | 1 | 1 | 1 | 1 | 1 | 1 | 1 |
| Air Permeability Coefficient ($\times 10^{-11}$ cc · cm/cm$^2$ · sec · cmHg) | 5 | 5 | 3 | 23 | 17 | 7 | 7 | 8 | 7 | 4 |
| Rate of Decrease in Pressure (%/month) | 1.5 | 1.5 | 1.3 | — | 2.1 | 1.9 | 2.0 | 1.9 | 1.9 | 1.6 |
| Rate of Decrease in Tire Pressure after Machining (%/month) | 1.8 | 1.5 | 1.4 | — | 2.6 | 2.5 | 2.5 | 2.1 | 2.0 | 1.7 |
| Appearance of Gas Barrier layer Inside Tire | No Wrinkles | No Wrinkles | No Wrinkles | — | Many Wrinkles | Many Wrinkles | Scattered Wrinkles | Few Wrinkles | No Wrinkles | No Wrinkles |

TABLE 6

|  | Com. Ex. | | | | | | | | | | | | | | | | | | | |
| --- | --- | --- | --- | --- | --- | --- | --- | --- | --- | --- | --- | --- | --- | --- | --- | --- | --- | --- | --- | --- |
|  | 11 | 12 | 13 | 14 | 15 | 16 | 17 | 18 | 19 | 20 | 21 | 22 | 23 | 24 | 25 | 26 | 27 | 28 | 29 | 30 |
| Rubber Composition | F | F | G | G | H | H | I | I | J | J | K | K | L | L | M | M | N | N | O | O |
| Gas Barrier Layer Composition | — | 2 | — | 2 | — | 2 | — | 2 | — | 2 | — | 2 | — | 2 | — | 2 | — | 2 | — | 2 |
| Air Permeability Coefficient ($\times 10^{-11}$ cc · cm/cm$^2$ · sec · cmHg) | 41 | 38 | 30 | 24 | 15 | 11 | 12 | 12 | 13 | 12 | 8 | 7 | 12 | 12 | 7 | 6 | 10 | 9 | 6 | 4 |
| Rate of Decrease in Pressure (%/month) | 2.7 | — | 2.3 | — | 2.5 | — | — | — | — | — | — | — | — | — | — | — | — | — | — | — |
| Rate of Decrease in Tire Pressure after Tire Machining (%/month) | 2.8 | — | 2.5 | — | 2.6 | — | — | — | — | — | — | — | — | — | — | — | — | — | — | — |
| Appearance of Gas Barrier layer Inside Tire | — | — | — | — | — | — | — | — | — | — | — | — | — | — | — | — | — | — | — | — |

Examples 6 to 8, in which gas barrier layer treatment by coating solution 1 was conducted and rubber compositions K, M and O which contain sodium-bentonite (clay mineral) in the rubber composition for the inner liner were used, were found to have lower air permeability, in comparison to Examples 13 to 15, in which rubber compositions J, L and N, which do not contain sodium-bentonite were used.

Comparative Examples 11 to 30, in which a thin film of coating solution 2 which does not include the inorganic layered compound was used or thin film treatment was not conducted, were inferior in the rate of decrease in pressure, rate of decrease in pressure after machining and appearance of the gas barrier layer, in comparison to the corresponding Examples 6 to 15 using the same rubber compositions, in which a thin film of coating solution 1 which includes the inorganic layered compound was used.

In Examples 6 to 8 and 13 to 15, in which rubber compositions J, K, L, M, N and O were used, excellent effects were obtained regarding the rate of decrease in pressure, rate of decrease in pressure after machining and appearance of the gas barrier layer, in comparison to Examples 9 to 12, in which a rubber compound, which does not contain any of or all of a butyl rubber, silica and silane coupling agent, was used.

When the appearance of the gas barrier layer inside the tire was observed, wrinkles were not found or were small in Examples 6 to 8 and 13 to 15 and therefore, rubber compositions J, K, L, M, N and O were found to be extremely superior in adhesion to the gas barrier layer.

EXAMPLES 16 TO 20 AND COMPARATIVE EXAMPLES 31 TO 45

<Evaluation as Rubber Composition>

After coating solutions 1 or 2 were formed into a film by casting on the various rubber samples obtained by rubber compositions P to Y, according to the compounding formula shown in Table 3, or without conducting film forming treatment, thermal treatment was conducted for 10 minutes at 100° C. The film thickness obtained by the treatment was approximately 5 μm. The air permeability evaluation was conducted with respect to the rubber. The results are shown in Table 7 and 8.

In each Example and Comparative Example, "1" indicates that coating solution 1 for the gas barrier layer was formed into a film, "2" indicates that coating solution 2 for the gas barrier layer was formed into a film and "-" indicates that a film was not formed, in the gas barrier composition of Tables 7 and 8.

<Evaluation as Tire>

A 195/65R14 tire was prepared using the above rubber composition as the carcass layer and then vulcanized. In Examples 16 to 20 and Comparative Example 32, an inner liner layer was not formed. In Comparative Example 31, an inner liner layer comprising the inner liner composition was formed on the inner face of the carcass layer.

The coating solution was applied to the inner face of the vulcanized tire using a certain spray gun and then dried. Then, thermal treatment was conducted for 10 minutes at 100° C. The film thickness obtained by the treatment was approximately 2 μm. The evaluation of the rate of decrease in tire pressure, the pressure test and evaluation of appearance after testing with a tire machine and the following tire durability test were conducted with respect to the tire. The results are shown in Table 7 and 8.

(Tire Durability Test)

An indoor drum test was conducted using a specific tire under conditions or running speed of 80 km/hour, pressure of 190 kPa and load of 464 kg. The running results are represented by the distance run from when running is begun until abnormality such as burst or change in the tire appearance (swelling) is observed. The durability is superior the longer the running distance is.

TABLE 7

| | Ex. | | | | |
|---|---|---|---|---|---|
| | 16 | 17 | 18 | 19 | 20 |
| Rubber Composition | U | W | Q | S | Y |
| Gas Barrier Layer Composition | 1 | 1 | 1 | 1 | 1 |
| Air Permeability Coefficient ($\times 10^{-11}$ cc·cm/cm²·sec·cmHg) | 4 | 4 | 15 | 6 | 2 |
| Inner Liner (Rubber Composition Z) (Air Permeability Coefficient: $19 \times 10^{-11}$ cc·cm/cm²·sec·cmHg) | None | None | None | None | None |
| Rate of Decrease in Pressure (%/month) | 2.0 | 2.0 | 2.7 | 2.1 | 1.8 |
| Tire Weight (kg) | 8.61 3.0 | 8.61 3.0 | 8.61 3.0 | 8.62 3.0 | 8.61 1.2 |
| Results of Durability Test (10,000 km) | No Breakage | No Breakage | No Breakage | No Breakage | Swelling of Sidewall area |
| Rate of Decrease in Tire Pressure after Machining | 2.1 | 2.0 | 3.6 | 3.2 | Unable to Measure |
| Appearance of Gas Barrier layer Inside Tire | No Wrinkles | No Wrinkles | Many Wrinkles | Few Wrinkles | — |

TABLE 8

| | Com. Ex. | | | | | | | | | | | | | | |
|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 |
| Rubber Composition | P | Q | Q | R | S | S | T | U | U | V | W | W | X | Y | Y |
| Gas Barrier Layer Composition | — | — | 2 | — | — | 2 | — | — | 2 | — | — | 2 | — | — | 2 |
| Air Permeability Coefficient ($\times 10^{-11}$ cc·cm/cm²·sec·cmHg) | 37 | 24 | 22 | 17 | 11 | 10 | 11 | 7 | 6 | 11 | 7 | 5 | 9 | 5 | 4 |

TABLE 8-continued

| | Com. Ex. | | | | | | | | | | | | | | |
|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 |
| Inner Liner (Rubber Composition Z) (Air Permeability Coefficient: $19 \times 10^{-11}$ cc · cm/cm$^2$ · sec · cmHg) | Present | None | — | — | — | — | — | — | — | — | — | — | — | — | — |
| Rate of Decrease in Pressure (%/month) | 2.5 | 4.1 | — | — | — | — | — | — | — | — | — | — | — | — | — |
| Tire Weight (kg) | 9.13 | 8.60 | — | — | — | — | — | — | — | — | — | — | — | — | — |
| | 3.0 | 3.0 | | | | | | | | | | | | | |
| Results of Durability Test (10,000 km) | No Breakage | No Breakage | — | — | — | — | — | — | — | — | — | — | — | — | — |
| Rate of Decrease in Tire Pressure after Machining | 2.6 | 5.0 | — | — | — | — | — | — | — | — | — | — | — | — | — |
| Appearance of Gas Barrier layer Inside Tire | — | — | — | — | — | — | — | — | — | — | — | — | — | — | — |

Examples 16 and 17, in which rubber compositions U and W which contain sodium-bentonite, silica and a silane coupling agent to a certain amount of natural rubber and butyl rubber were used and coating solution 1 was used as the thin film, were found to exhibit a low air permeability coefficient, in comparison to Comparative Examples 31 to 45.

The tires of Examples 16 and 17, in which rubber compositions U and W which contain sodium-bentonite, silica and a silane coupling agent were used and coating solution 1 was used as the thin film, were superior in the rate of decrease in pressure, rate of decrease in pressure and appearance of the gas barrier layer inside the tire after the drum test, in comparison to Comparative Examples 31 and 32 and Examples 18 and 19. Also, the weight of the tires were light. The tire of Example 20, in which rubber composition Y which does not include natural rubber was used and coating solution 1 was used as the thin film, had a low air permeability coefficient and was excellent in the rate of decrease in air pressure, but had problems regarding durability.

Because the tubeless tire of the present invention has a gas barrier layer comprising a specific inorganic layered compound and resin, the gas barrier properties are extremely excellent and the tire is extremely excellent in air maintaining properties and can maintain air pressure with stability over a long period.

By laminating a gas barrier layer comprising an inorganic layered compound having a large aspect ratio and resin to the inner face side of the inner liner layer via an anchor coat layer, the inorganic layered compound is laminated on the inner face of the inner liner layer in a sufficiently dispersed state. As a result, a pneumatic tire in which cracks do not occur and air permeability is significantly decreased, that is a pneumatic tire in which pressure maintaining properties are significantly improved without decreasing processability and productivity, can be obtained. Also, because air permeability is significantly decreased, the inner liner layer can be made thin and a lightweight tire and subsequently low fuel consumption can be achieved.

By compounding the inorganic layered compound in the inner liner rubber composition and applying a gas barrier layer with decreased air permeability comprising the composition containing the inorganic layered compound and resin to the inner face of the inner liner, air permeability is significantly decreased. Also, a pneumatic tire which enables obtaining a lightweight tire can be obtained without losing the pressure maintaining properties.

By compounding the inorganic layered compound in the conventionally used carcass layer and applying a gas barrier layer comprising the composition containing the inorganic layered compound and resin to the inner face of the carcass layer, air permeability is significantly decreased. As a result, the inner liner can be removed and the tire can be made significantly lighter.

By firmly laminating the gas barrier layer as a coating film, the gas barrier layer can be firmly formed on the inner face of the tire body without unevenness in adhesion.

What is claimed is:

1. A tubeless tire wherein an air chamber is formed between an inner face of a tire body and a rim thereof, by mounting said tire body to the periphery of said rim; and
    an inner liner layer is formed on said inner face of said tire body,
    wherein said inner liner layer comprises a rubber composition containing as rubber components,
    60 to 100% by weight of at least one kind of butyl rubber selected from the group consisting of butyl rubber, halogenated butyl rubber and a halogenated copolymer of isomonoolefin having 4 to 7 carbon atoms and paraalkylstyrene; and
    0 to 40% by weight of at least one kind of diene rubber selected from the group consisting of natural rubber, isoprene rubber, styrene-butadiene rubber, butadiene rubber and styrene-isoprene-butadiene rubber; and
    silica as an inorganic filler, wherein the content of said inorganic filler is at least 10 parts by weight based on 100 parts by weight of said rubber component; and
    a gas barrier layer is formed on an inner face of said inner liner layer, wherein said gas barrier layer is formed of a gas barrier resin composition which contains an inorganic layered compound having a particle size of at most 5 μm and an aspect ratio of 50 to 5000, and a resin,
    wherein said resin is polyvinyl alcohol.

2. The tubeless tire of claim 1, wherein said gas barrier layer is formed on said inner face of said inner liner layer via an anchor coat layer.

3. The tubeless tire of claim 1, wherein said inorganic layered compound is a clay mineral having swellability, that is swelled and cleaved in a solvent, and
    wherein in said gas barrier layer, said inorganic layered compound and said resin are mixed in a volume ratio of 5/95 to 90/10.

4. The tubeless tire of claim 1, wherein said gas barrier layer is obtained by
    dispersing said inorganic layered compound in said resin or a resin solution in a state of being swelled or cleaved in a solvent, applying said solution to the inner face side of said inner liner layer while maintaining said state, and removing said solvent.

5. The tubeless tire of claim 1, wherein said gas barrier layer has a thickness of at most 0.5 mm.

6. The tubeless tire of claim 1, wherein said rubber composition comprises an inorganic layered compound, wherein the content of said inorganic layered compound included in said rubber composition is 0.5 to 20 parts by weight based on 100 parts by weight of said rubber component.

7. The tubeless tire of claim 6, wherein said inorganic layered compound included in said rubber composition is organically treated.

8. The tubeless tire of claim 1, wherein said gas barrier layer is formed on said inner face of said inner liner layer directly.

9. The tubeless tire of claim 1, wherein said rubber composition comprises an inorganic layered compound having a particle size of at most 5 µm and an aspect ratio of 50 to 5000, which is dispersed in said rubber component.

10. The tubeless tire of claim 1, wherein said rubber composition comprises a silane coupling agent.

11. A tubeless tire wherein an air chamber is formed between an inner face of a tire body and a rim thereof, by mounting said tire body to the periphery of said rim; and a gas barrier layer formed of a gas barrier resin composition which contains an inorganic layered compound having a particle size of at most 5 µm and an aspect ratio of 50 to 5000, and a resin, is formed on said inner face of a carcass layer;

said carcass layer comprises a rubber composition containing a rubber component, an inorganic layered compound, an inorganic filler and a silane coupling agent, wherein said rubber component contains:

0 to 60% by weight of at least one kind of butyl rubber selected from the group consisting of butyl rubber, halogenated butyl rubber and a halogenated copolymer of isomonoolefin having 4 to 7 carbon atoms and paraalkylstyrene, and 40 to 100% by weight of at least one kind of diene rubber selected from the group consisting of natural rubber, isoprene rubber, styrene-butadiene rubber, butadiene rubber and styrene-isoprene-butadiene rubber;

said inorganic layered compound has a particle size of at most 5 µm and an aspect ratio of 50 to 5000, which is dispersed in said rubber component;

said inorganic filler is silica; and said resin is polyvinyl alcohol.

12. The tubeless tire of claim 11, wherein said inorganic layered compound of said gas barrier layer is a clay mineral having swellability, that is swelled and cleaved in a solvent, and wherein in said gas barrier layer, said inorganic layered compound and said resin are mixed in a volume ratio of 5/95 to 90/10.

13. The tubeless tire of claim 11, wherein said gas barrier layer is obtained by dispersing said inorganic layered compound in said resin or a resin solution in a state of being swelled or cleaved in a solvent, applying said solution to the inner face side of said carcass layer while maintaining said state, and removing said solvent.

14. The tubeless tire of claim 11, wherein said gas barrier layer has thickness of at most 0.5 mm.

15. The tubeless tire of claim 11, wherein the content of said inorganic filler is at least 10 parts by weight based on 100 parts by weight of said rubber component.

16. The tubeless tire of claim 11, wherein the content of said inorganic layered compound included in said rubber composition is 0.5 to 20 parts by weight based on 100 parts by weight of said rubber component.

17. The tubeless tire of claim 11, wherein said inorganic layered compound included in said rubber composition is organically treated.

18. The tubeless tire of claim 11, wherein said tire has no inner liner.

\* \* \* \* \*